(12) United States Patent
Nakano

(10) Patent No.: US 9,547,223 B2
(45) Date of Patent: Jan. 17, 2017

(54) AIR FILTER INCLUDING A HOLDING FRAME FORMED OF A RESILIENT MATERIAL AND PROJECTOR

(71) Applicant: Seiko Epson Corporation, Tokyo (JP)

(72) Inventor: Kiyotaka Nakano, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 14/215,186

(22) Filed: Mar. 17, 2014

(65) Prior Publication Data

US 2014/0293240 A1    Oct. 2, 2014

(30) Foreign Application Priority Data

Mar. 27, 2013  (JP) ................................ 2013-065803
Jan. 20, 2014  (JP) ................................ 2014-007532

(51) Int. Cl.
| | |
|---|---|
| *G03B 21/16* | (2006.01) |
| *B01D 46/00* | (2006.01) |
| *G03B 21/20* | (2006.01) |
| *G03B 21/14* | (2006.01) |
| *B01D 46/10* | (2006.01) |

(52) U.S. Cl.
CPC ............ *G03B 21/16* (2013.01); *B01D 46/0005* (2013.01); *B01D 46/10* (2013.01); *G03B 21/145* (2013.01); *G03B 21/20* (2013.01); *G03B 21/2086* (2013.01); *G03B 21/2093* (2013.01); *B01D 2275/203* (2013.01)

(58) Field of Classification Search
CPC ....... G03B 21/16; G03B 21/145; G03B 21/20; G03B 21/2086; G03B 21/2093; H04N 9/3144
See application file for complete search history.

(56) References Cited

U.S. PATENT DOCUMENTS

| | | | | |
|---|---|---|---|---|
| 7,320,524 | B2 * | 1/2008 | Lee et al. .......................... | 353/60 |
| 7,527,680 | B2 * | 5/2009 | Horiguchi et al. ............. | 96/422 |
| 7,535,711 | B2 * | 5/2009 | Saegusa et al. ............... | 361/695 |
| 7,621,643 | B2 * | 11/2009 | Hirosawa et al. .............. | 353/58 |
| 7,677,962 | B2 * | 3/2010 | Chang ............................ | 454/184 |
| 7,753,533 | B2 * | 7/2010 | Kaneko ........................... | 353/61 |
| 7,950,811 | B2 * | 5/2011 | Nagahata et al. ............. | 353/119 |
| 8,172,406 | B2 * | 5/2012 | Yamagishi ...................... | 353/61 |
| 8,292,980 | B2 * | 10/2012 | Yamagishi et al. ............. | 55/354 |
| 8,317,337 | B2 * | 11/2012 | Watanabe .............. | G03B 21/16 353/57 |
| 8,388,144 | B2 * | 3/2013 | Uozaki et al. .................. | 353/57 |
| 8,465,156 | B2 * | 6/2013 | Nakashita ....................... | 353/58 |

(Continued)

FOREIGN PATENT DOCUMENTS

| | | |
|---|---|---|
| CN | 2772866 Y | 4/2006 |
| JP | 2010-122281 A | 6/2010 |

*Primary Examiner* — Bao-Luan Le
(74) *Attorney, Agent, or Firm* — ALG Intellectual Property, LLC

(57) ABSTRACT

An air filter includes a filter body configured to trap dust contained in air passing therethrough and a holding frame configured to surround an end edge of the filter body, and the holding frame is formed of a resilient material. The holding frame includes a first surface on a proximal end side in a direction of travel of air passing through the filter body, and a second surface on a distal end side in the direction of travel, and one of the first surface and the second surface is provided with a projecting portion.

7 Claims, 7 Drawing Sheets

(56) References Cited

U.S. PATENT DOCUMENTS

| | | | |
|---|---|---|---|
| 8,562,144 B2* | 10/2013 | Nakajima et al. | 353/61 |
| 2005/0254021 A1* | 11/2005 | Lee et al. | 353/119 |
| 2006/0017889 A1* | 1/2006 | Ishii et al. | 353/57 |
| 2006/0187420 A1* | 8/2006 | Wei et al. | 353/61 |
| 2006/0209267 A1* | 9/2006 | Hirosawa et al. | 353/58 |
| 2007/0058133 A1* | 3/2007 | Totani | 353/20 |
| 2007/0207721 A1* | 9/2007 | Chang | 454/184 |
| 2008/0252859 A1* | 10/2008 | Nagahata et al. | 353/61 |
| 2009/0009728 A1* | 1/2009 | Liu et al. | 353/57 |
| 2010/0007856 A1* | 1/2010 | Fujisaki et al. | 353/52 |
| 2010/0026967 A1* | 2/2010 | Yamagishi | 353/61 |
| 2010/0033688 A1* | 2/2010 | Obama et al. | 353/61 |
| 2010/0128230 A1* | 5/2010 | Kotaka et al. | 353/57 |
| 2010/0225888 A1* | 9/2010 | Watanabe | G03B 21/16 353/52 |
| 2011/0032489 A1* | 2/2011 | Kimoto et al. | 353/56 |
| 2011/0109883 A1* | 5/2011 | Ito | 353/61 |
| 2011/0255058 A1* | 10/2011 | Kotani | 353/61 |
| 2011/0279785 A1* | 11/2011 | Kanbara et al. | 353/52 |
| 2012/0008100 A1* | 1/2012 | Tani et al. | 353/58 |
| 2012/0086918 A1* | 4/2012 | Furumi | 353/52 |
| 2013/0169942 A1* | 7/2013 | Chen et al. | 353/61 |
| 2013/0298773 A1* | 11/2013 | Yamagishi et al. | 96/15 |
| 2013/0300946 A1* | 11/2013 | Manabe et al. | 348/739 |

\* cited by examiner

AIR FILTER INCLUDING A HOLDING FRAME FORMED OF A RESILIENT MATERIAL AND PROJECTOR

BACKGROUND

1. Technical Field

The present invention relates to an air filter and a projector.

2. Related Art

In the related art, a projector configured to introduce outside air into an interior thereof via an air-inlet port provided in an external housing and supply introduced air to objects to be cooled such as a light source apparatus or a light-modulating apparatus is known.

Air existing outside of the projector may include dust. When the dust is introduced into the interior of the projector, the dust may be adhered to optical components and hence images to be projected may be deteriorated, or components of the projector may have problems. Therefore, a configuration in which an air filter having a filter body configured to remove dust and a holding frame configured to hold the filter body is provided at an air-inlet port is known (for example, see JP-A-2010-122281.

However, if the holding frame is not in tight contact with an external housing, air may be introduced into the interior of the external housing through a gap between the holding frame and the external housing. In this case, dust contained in the air may disadvantageously be introduced into the interior of the external housing.

SUMMARY

An advantage of some aspects of the invention is to provide an air filter and a projector configured to preferably remove dust.

A first aspect of the invention is directed to an air filter including a filter body configured to trap dust contained in air passing therethrough and a holding frame configured to surround an end edge of the filter body, and the holding frame is formed of a resilient material.

According to the first aspect of the invention, when the air filter is interposed between a pair of opposed surfaces formed in an external housing of an electronic apparatus, each of the opposed surfaces and the holding frame formed of the resilient material may be brought into tight contact with each other. Accordingly, introduction of air into the interior of the external housing through gaps between the holding frame and the opposed surfaces opposing the holding frame is suppressed. Therefore, dust is preferably removed by the filter body. With the tight contact between the holding frame and the opposed surfaces, rattling of the holding frame is suppressed.

Since the holding frame is formed of the resilient material, even in the case where the external housing of the electronic apparatus on which the air filter is mounted is curved, the holding frame is deformed in accordance with the curved surface of the external housing, and hence the air filter may be arranged along the shape of the eternal housing.

In the first aspect of the invention, it is preferable that the holding frame includes a first surface on a proximal end side in a direction of travel of the air passing through the filter body and a second surface on a distal end side in the direction of travel of the same, and one of the first surface and the second surface is provided with a projecting portion.

The proximal end side in the direction of travel of the air here corresponds to an upstream side of an airflow, and the distal end side in the direction of travel of the air corresponds to a downstream side of the airflow.

According to the first aspect of the invention with the configuration described above, with the air filter interposed between the pair of opposed surfaces so as to allow a deformation of the projecting portion, one of the first surface and the second surface of the holding frame, on which the projecting portion is not provided, may be brought into tight contact with the opposed surface that the corresponding surface opposes by a force of the projecting portion returning to an original shape. Therefore, the holding frame may be brought into tight contact with the external housing preferably, whereby dust is preferably removed by the filter body.

In the first aspect of the invention, it is preferable that the holding frame includes a pair of edge portions opposing each other in a direction orthogonal to the direction of travel of the air, and one of the first surface of each of the pair of edge portions and the second surface of each of the pair of edge portions is provided with the projecting portion.

Here, when the air filter is interposed between the pair of opposed surfaces, and when the projecting portion is provided only on one of the pair of edge portions, it is difficult to bring the surface of the other edge portion on which the projecting portion is not provided into tight contact with the opposed surface that the corresponding surface opposes. Also, in the case where the projecting portion is provided on the first surface of one of the pair of edge portions and the projecting portion is provided on the second surface of the other edge portion, the holding frame is inclined with respect to the pair of opposed surfaces. Therefore, it is difficult to bring the surface of each of the edge portions on which the projecting portion is not provided into tight contact with the opposed surface that the corresponding surface opposes.

In contrast, according to the first aspect of the invention with the configuration described above, since the projecting portion is provided on the first surface or the second surface of each of the edge portions, the inclination of the holding frame with respect to the opposed surfaces may be suppressed, one of the first surface and the second surface of the holding frame, on which the projecting portion is not provided, may be brought into tight contact with the opposed surface that the corresponding surface opposes. Therefore, the holding frame may be brought into tight contact with the opposed surfaces preferably, whereby dust is preferably removed by the filter body.

In the first aspect of the invention, it is preferable that the projecting portion has a tapered shape in which one of both ends in a longitudinal direction of the edge portion provided with the projecting portion projects from the edge portion more than the other end when viewed in a direction of circulation of the air passing through the filter body.

According to the first aspect of the invention with the configuration described above, since the projecting portion is formed into a tapered shape, when the air filter is inserted into an opening portion formed in the external housing of the electronic apparatus so as to be interposed between the pair of opposed surfaces, a sliding resistance generated by the projecting portion may be reduced. Therefore, the holding frame may be inserted easily into the opening portion.

In the first aspect of the invention, it is preferable that the resilient material is elastomer.

According to the first aspect of the invention with the configuration described above, when the air filter is interposed between the pair of opposed surfaces, the holding frame and the opposed surfaces are preferably brought into tight contact.

A second aspect of the invention is directed to a projector configured to project an image and including: an external housing constituting an exterior and, the external housing includes: an introducing port configured to introduce outside air; the air filter described above provided at a position depending on the introducing port; and a pair of opposed surfaces opposing the holding frame.

According to the second aspect of the invention, the same effects and advantages as the air filter described above may be achieved.

In other words, since the holding frame of the air filter is formed of the resilient material, the holding frame may be brought into tight contact with the opposed surfaces that oppose the holding frame. Accordingly, introduction of air into the interior of the external housing through the gaps between the holding frame and the pair of opposed surfaces is suppressed. Therefore, dust is preferably removed by the filter body and, in addition, the air filter is suppressed from rattling between the pair of opposed surfaces. Furthermore, even when the external housing on which the introducing port is provided is curved, the air filter may be arranged along the shape of the eternal housing.

BRIEF DESCRIPTION OF THE DRAWINGS

The invention will be described with reference to the accompanying drawings wherein like numbers reference like elements.

DESCRIPTION OF EXEMPLARY EMBODIMENTS

Hereinafter, an embodiment of the invention will be described with reference to the drawings.

Appearance Configuration of Projector

Figure 1:
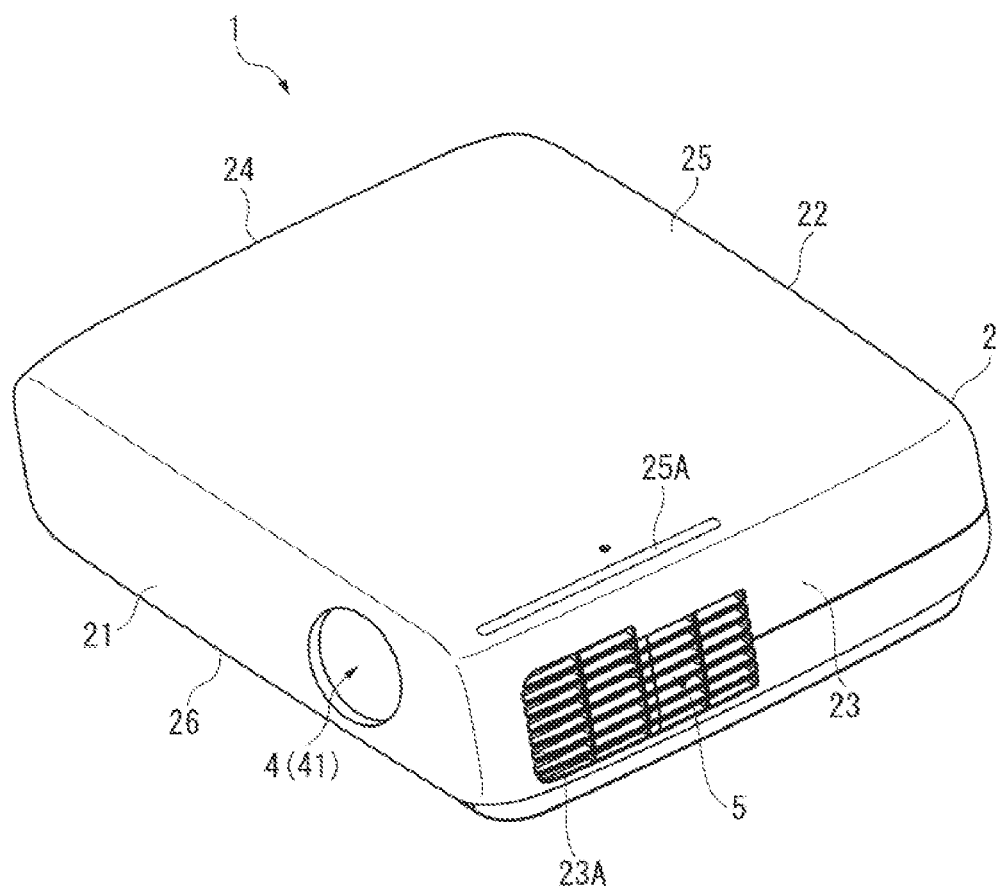
FIG. 1 is a perspective view of a projector according to an embodiment of the invention.

FIG. 1 is a perspective view of a projector 1 viewed from above a front surface.

The projector 1 is configured to modulate an optical flux emitted from a light source according to image information and form image light, and project the formed image light on a projecting surface (not illustrated) such as a screen in an enlarged scale. The projector 1 as described above includes an external housing 2 and an apparatus body 4 housed in the external housing 2 as illustrated in FIG. 1.

The apparatus body 4 from the members described above includes the light source, a light-modulating apparatus configured to modulate the light emitted from the light source, and a projecting optical apparatus 41 configured to project the modulated light (image light), although part of the configuration will be omitted. The apparatus body 4 includes not only a cooling fan 42 (see FIG. 3) configured to send air to the objects to be cooled, but also a power source device and a control device.

Configuration of External Housing

The external housing 2 includes a front surface portion 21, a back surface portion 22, a right side surface portion 23, a left side surface portion 24, a ceiling surface portion 25, and a bottom surface portion 26 as illustrated in FIG. 1, and hence has a substantially parallelepiped shape.

An air-inlet port 23A as an inlet port configured to introduce air existing outside the external housing 2 into the interior thereof is formed on a front surface side of the right side surface portion 23 among these surface portions. A filter storage portion 27 configured to house an air filter 5 that removes dust from air passing through the air-inlet port 23A is provided inside the air-inlet port 23A.

The ceiling surface portion 25 includes an opening 25A for inserting and pulling out the air filter 5 into and from the filter storage portion 27 formed along the right side surface portion 23.

Configuration of Air Filter

Figure 2:
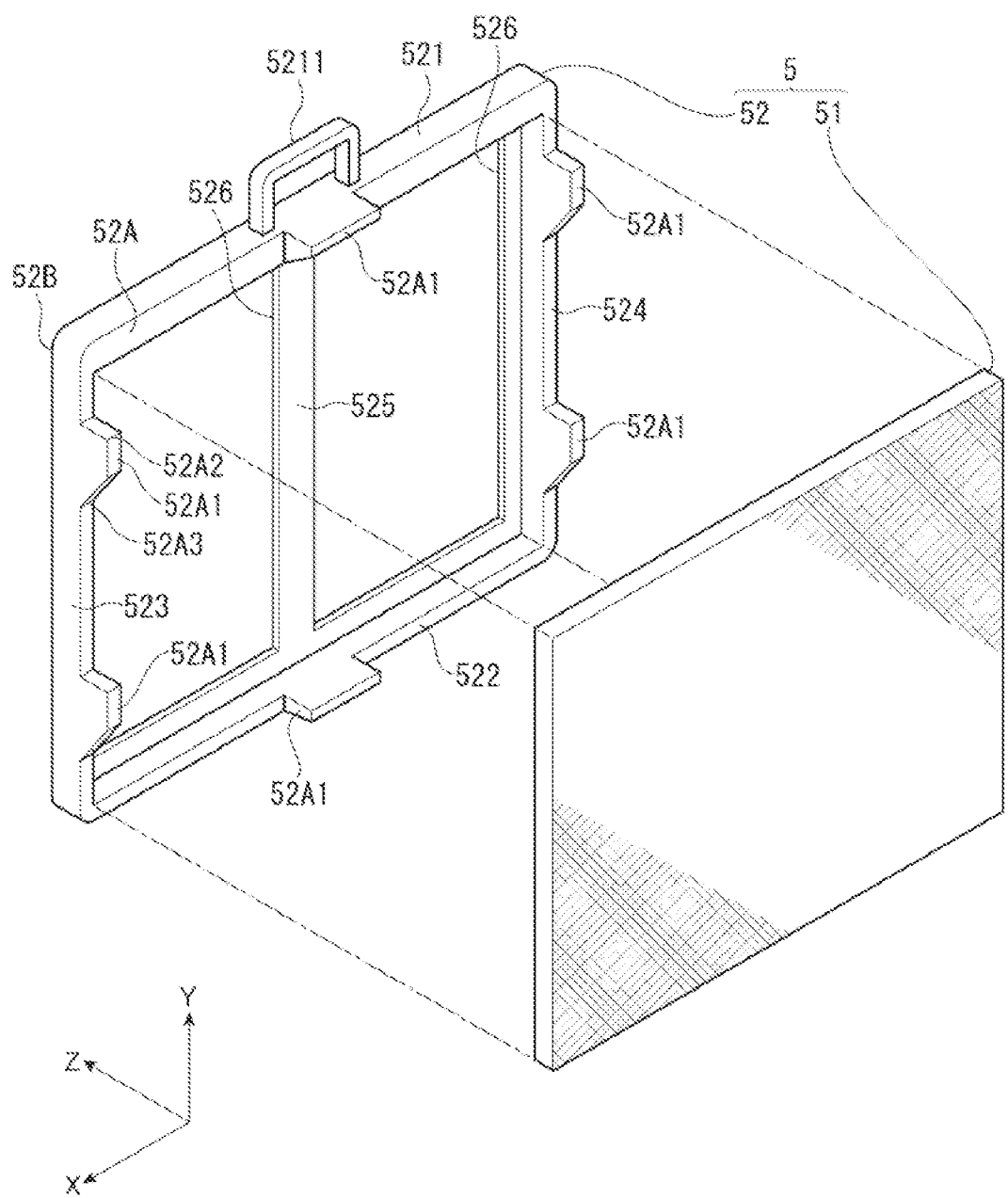
FIG. 2 is a perspective view of an air filter of the embodiment.

FIG. 2 is a perspective view illustrating the air filter 5 viewed in a direction in which a filter body 51 is mounted on a holding frame 52. In the following description, a Z-direction indicates a direction of travel of air passing through the air filter. An X-direction and a Y-direction are directions orthogonal to the Z-direction, and are directions orthogonal to each other. From among these directions, the Y-direction is parallel to a direction of inserting and pulling out the air filter 5 into and from the opening 25A.

The air filter 5 includes the filter body 51 and the holding frame 52 configured to support the filter body 51 as illustrated in FIG. 2.

The filter body 51 is configured to trap dust contained in air passing therethrough, and is formed to have a substantially rectangular shape. The filter body 51 is formed to have a surface area larger than the surface area of the air-inlet port 23A.

The holding frame 52 has a substantially rectangular frame shape, and configured to hold the filter body 51 by surrounding end edges thereof. The holding frame 52 is entirely formed of a resilient material such as elastomer.

The holding frame 52 having the configuration as described above includes a pair of edge portions 521 and 522 extending in the X-direction and opposing each other in the Y-direction, and a pair of edge portions 523 and 524 extending in the Y-direction and opposing each other in the X-direction. Specifically, the edge portion 521 is positioned on a distal end side in the Y-direction, and the edge portion 522 is positioned on a proximal end side in the Y-direction. The edge portion 523 is positioned on a distal end side in the X-direction, and the edge portion 524 is positioned at a proximal end side in the X-direction. From among these edge portions, the edge portion 521 is provided with a grip portion 5211 of a substantially U-shape projecting toward the distal end side in the Y-direction.

The holding frame 52 includes a supporting portion 525 formed along an XY plane in a space surrounded by the edge portions 521 to 524, and configured to support the filter body 51. The supporting portion 525 includes two opening portions 526 having a substantially rectangular shape so as to allow air passing through the filter body 51 to circulate.

The holding frame 52 includes a first surface 52A opposing a proximal end side in the Z-direction and a second surface 52B opposing a distal end side in the Z-direction along each of the edge portions 521 to 524.

The first surface 52A is provided with projecting portions 51A1 each projecting in a direction opposite from the Z-direction formed integrally with the edge portions 521 to 524. Specifically, the projecting portions 52A1 are provided not only at substantially center portions on the edge portions 521 and 522 in the X-direction, but also on the edge portions 523 and 524 near both end portions in the Y-direction, respectively. The projecting portions 52A1 are part of the holding frame 52, and are formed of a resilient material. The projecting portions 52A1 are each formed into a tapered shape having an end portion 52A2 on the distal end side in the Y-direction (a +Y direction side) projecting toward the proximal end side in the Z-direction with respect to an end portion 52A3 on a proximal end side of the Y-direction (a −Y direction side). Furthermore, a dimension of the holding frame 52 including the projecting portions 52A1 in the Z-direction is set to be larger than a dimension of the filter storage portion 27, described later, (see FIG. 3 and FIG. 4) in the same direction.

Configuration of Filter Storage Portion

Figure 3:
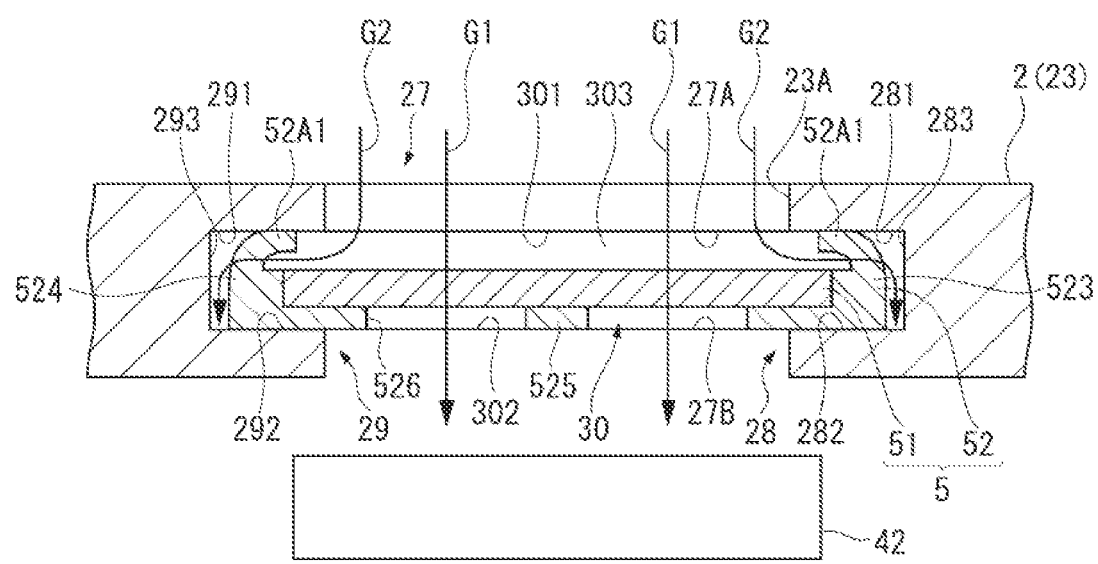
FIG. 3 is a partial cross-sectional view illustrating a mounting structure of the air filter of the embodiment.
Figure 4:
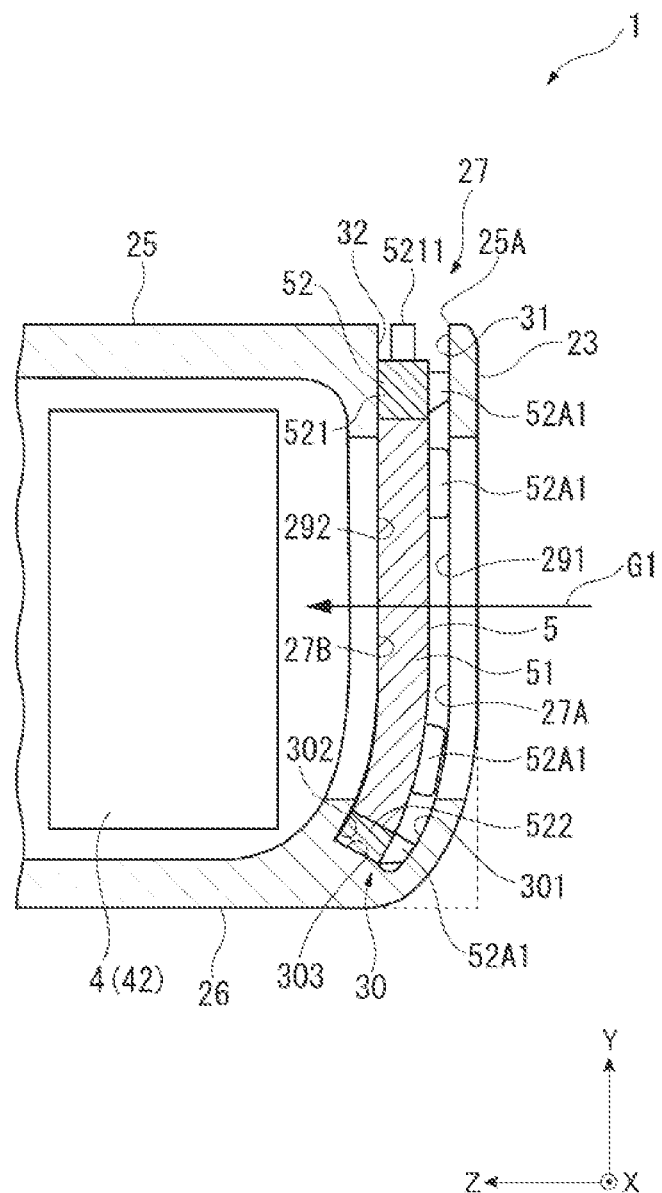
FIG. 4 is a partial cross-sectional view illustrating the mounting structure of the air filter of the embodiment.

FIG. 3 and FIG. 4 are drawings illustrating a state in which the air filter 5 is inserted into the filter storage portion 27 provided in the external housing 2. FIG. 3 is a partial cross-sectional view of the projector 1 viewed from above, and FIG. 4 is a partial cross-sectional view of the projector 1 viewed from the front.

The filter storage portion 27 having a depth in the vertical direction of the external housing 2 is provided on the right side surface portion 23 of the external housing 2 as illustrated in FIG. 3 and FIG. 4. The filter storage portion 27 includes a pair of depressed portions 28 and 29 formed at left and right end edges of the air-inlet port 23A (FIG. 3), and a depressed portion 30 (FIG. 4) formed at a lower end edge of the air-inlet port 23A, and includes a pair of opposed surfaces 27A and 27B composed of the depressed portions 28 to 30 and opposing each other along the direction of flow of air passing through the air filter 5.

Specifically, the depressed portion 28 positioned on the front surface side of the air-inlet port 23A (the depressed portion 28 on the right side in FIG. 3) includes a pair of side surfaces 281 and 282 opposing each other in a G1 direction, which is the direction of circulation of air passing through the air filter 5, and a connecting surface 283 connecting end portions of the side surfaces 281 and 282 on the front surface side as illustrated in FIG. 3.

Specifically, the depressed portion 29 positioned on the rear surface side of the air-inlet port 23A (the depressed portion 29 on the left side in FIG. 3) includes a pair of side surfaces 291 and 292 opposing each other in the G1 direction, and a connecting surface 293 connecting end portions of the side surfaces 291 and 292 on the rear surface side.

The depressed portions 28 and 29 are arranged so that the connecting surfaces 283 and 293 oppose each other, and the surfaces 281 to 283, and 291 to 293 are formed respectively along the vertical direction.

As illustrated in FIG. 4, the depressed portion 30 includes a pair of side surfaces 301 and 302 opposing each other in the G1 direction and a connecting surface 303 connecting end portions on the lower sides of the side surfaces 301 and 302.

The side surface 301 is formed as a surface continuing not only from the side surfaces 281 and 291, but also from an inner surface 31 on the same side as the right side surface portion 23, which constitutes an end edge of the opening 25A, and these surfaces 281, 291, 301, and 31 constitute the opposed surface 27A.

The side surface 302 is formed as a surface continuing not only from the side surfaces 282 and 292, but also from an inner surface 32 on the same side as the left side surface portion 24, which constitutes an end edge of the opening 25A, and these surfaces 282, 292, 302, and 32 constitute the opposed surface 27B.

When mounting the air filter 5 in the filter storage portion 27, the air filter 5 is inserted into the opening 25A in the direction opposite to the Y-direction from the edge portion 522 side so that the first surface 52A opposes the opposed surface 27A and the second surface 52B opposes the opposed surface 27B.

In a state in which the air filter 5 is mounted in the filter storage portion 27, the edge portion 522 is arranged in the depressed portion 30, and the edge portions 523 and 524 are arranged in the depressed portions 28 and 29 respectively. In this case, the projecting portion 52A1 provided at the edge portion 522 abuts against the side surface 301, and the projecting portions 52A1 provided at the edge portions 523 and 524 abut against the side surfaces 281 and 291. Furthermore, the projecting portion 52A1 provided at the edge portion 521 abuts against the inner surface 31.

Here, a dimension of the holding frame 52 along the Z-direction is slightly larger than the dimension between the opposed surfaces 27A and 27B, so that the projecting portions 52A1 are deformed inward of the holding frame 52 to apply resilient stresses to the holding frame 52 toward the opposed surface 27B.

Therefore, the second surface 52B of the edge portion 521 is pressed against the inner surface 32 by the projecting portion 52A1 of the edge portion 521, and the second surface 52B of the edge portion 522 is pressed against the side surface 302 by the projecting portion 52A1 of the edge portion 522. In the same manner, the second surface 52B of the edge portion 523 is pressed against the side surface 282 by the projecting portions 52A1 of the edge portion 523, and the second surface 52B of the edge portion 524 is pressed against the opposed surface 292 by the projecting portions 52A1 of the edge portion 524.

In this manner, the second surface 52B of the holding frame 52 comes into tight contact with the opposed surface 27B.

In this configuration, since a gap is not formed between the second surface 52B of the holding frame 52 and the opposed surface 27B, air introduced from the air-inlet port 23A by driving the cooling fan 42 arranged in the vicinity of the air-inlet port 23A passes reliably through the filter body 51, and is introduced into the interior of the external housing 2.

Therefore, introduction of air which is not passed through the filter body 51 (for example, air circulating along a direction G2) into the interior of the external housing 2 through the gap is suppressed.

A lower end portion of the right side surface portion 23 of the external housing 2 is curved into a curved surface as illustrated in FIG. 1 and FIG. 4. Furthermore, although illustration is omitted, a lower end portion of the left side surface portion 24 is also curved in the same manner. A portion near a front surface end and a portion near a rear surface end of the right side surface portion 23 and a portion near a front surface end and a portion near a rear surface end of the left side surface portion 24 are also curved. This is based on aims of improvement of design and space saving which may be achieved more in comparison with a case where the side surface portion of the external housing 2 is a flat surface over the entire area (a case of a shape illustrated by a dot line).

The holding frame 52 of the air filter 5 mounted in the filter storage portion 27 provided on the right side surface portion 23 curved in this manner is formed of the resilient material as described above, and hence is curved along the shape of the filter storage portion 27. Accordingly, insertion to a lower end of the filter storage portion 27 is achieved.

According to the projector 1 of the embodiment described thus far, the following effects and advantages are achieved.

When the air filter 5 is inserted into the filter storage portion 27, since the holding frame 52 is formed by the resilient material, the second surface 52B of the holding frame 52 comes into tight contact with the opposed surface 27B. Accordingly, formation of the gap between the holding frame 52 and the second surface 52B is suppressed, and hence introduction of air into the interior of the external housing 2 through the gap is suppressed. Therefore, dust maybe removed preferably from air introduced into the external housing 2 by the filter body 51. Also, by the tight contact between the holding frame 52 and the external housing 2, rattling of the air filter 5 is also suppressed.

In addition, since the holding frame 52 is formed of the resilient material, the air filter 5 may be arranged along the external housing 2 by a deformation of the holding frame 52.

The holding frame 52 is provided with the projecting portions 52A1 on the first surface 52A. In this configuration, when the air filter 5 is inserted into the filter storage portion 27, the projecting portions 52A1 are deformed to cause a resilient stress to the holding frame 52, so that the second surface 52B of the holding frame 52 may be brought into tight contact with the opposed surface 27B. Therefore, since formation of the gap between the second surface 52B and the opposed surface 27B is reliably suppressed, a configuration in which air introduced into the external housing 2 passes through the filter body 51 is achieved, so that dust contained in the air may be removed further preferably by the filter body 51.

The edge portions 523 and 524 are provided with the projecting portions 52A1 on the first surface 52A side. In this configuration, when the air filter 5 is inserted into the filter storage portion 27, the projecting portions 52A1 of the edge portions 523 and 524 may be brought into abutment with the side surfaces 281 and 291, that is, with the opposed surface 27A. In this configuration, rattling occurring when the projecting portions 52A1 are provided only on one of the edge portions 523 and 524 or an inclination of the air filter 5 occurring in the case where the projecting portions are provided on the first surface 52A side of one of the edge portions and the projecting portions are provided on the second surface 52B side of the other edge portion may be suppressed. Therefore, the holding frame 52 may be brought into tight contact with the filter storage portion 27 further preferably, whereby dust is preferably removed by the filter body 51.

Furthermore, in this embodiment, the projecting portions 52A1 are provided respectively on the edge portions 523 and 524 in the vicinity of both end portions thereof on the first surface 52A side in the Y-direction, and the projecting portions 52A1 are provided also on the edge portions 521 and 522 on the first surface 52A side, so that the inclination of the air filter 5 is reliably suppressed.

The projecting portions 52A1 are formed into a tapered shape in which an end portion on a distal end side in the Y-direction projects more than an end portion of a proximal end side in the Y-direction. In this configuration, when the air filter 5 is inserted into the filter storage portion 27, the sliding resistance of the projecting portions 52A1 is reduced. Therefore, the air filter 5 may be inserted easily into the filter storage portion 27.

Modification of Embodiment

The invention is not limited to the embodiment described above, and modifications and improvements in a range which achieves the object of the invention are included in the invention.

In the embodiment described above, the air-inlet port 23A and the filter storage portion 27 are provided at a portion of the right side surface portion 23 having a relatively flat outer edge in the fore-and-aft direction (lateral direction in FIG. 3), and the opening 25A for inserting the air filter 5 into the filter storage portion 27 is provided in the ceiling surface portion 25. However, the invention is not limited thereto. In other words, the position on the external housing 2 where the air filter 5 is mounted may be any position thereof.

Figure 5:
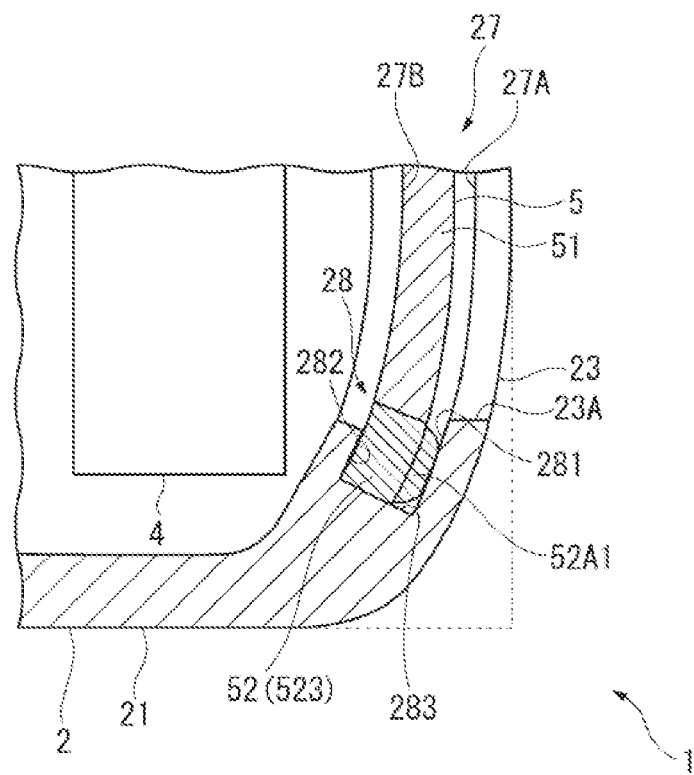
FIG. 5 is a partial cross-sectional view illustrating a mounting structure according to a modification of the air filter of the embodiment.

FIG. 5 is a partial cross sectional view of the projector 1 viewed from the ceiling surface portion 25 side. In other words, FIG. 5 is a partial cross-sectional view of the external housing 2 illustrating a cross section thereof in the horizontal direction viewed from the ceiling surface portion 25 side.

For example, in an example illustrated in FIG. 5, the air-inlet port 23A and the filter storage portion 27 are provided so as to be overlapped with portions near the curved front surface end portion of the right side surface portion 23. The dot line in the drawing indicates a shape of a case where the front surface portion 21 and the right side surface portion 23 are entirely flat surfaces.

Even though the air filter 5 is mounted in the curved filter storage portion 27, the holding frame 52 formed of the resilient material curves so as to follow the curved shape of the filter storage portion 27. Therefore, the air filter 5 can be inserted to the front surface end of the filter storage portion 27.

In the above-described embodiment, the projecting portions 52A1 are provided on the holding frame 52. However, the invention is not limited thereto. In other words, the holding frame 52 does not necessarily have to have the projecting portions 52A1. Even when the projecting portions 52A1 are provided, the number and arrangement of the projecting portions 52A1 may be changed as needed. For example, the projecting portions do not have to be provided on the edge portions 521 and 522, and a configuration in which one each or three or more each of the projecting portions 52A1 are provided on each of the edge portions 523 and 524.

In the above-described embodiment, the projecting portions 52A1 are provided on the first surface 52A of the holding frame 52. However, the invention is not limited thereto. In other words, the projecting portions 52A1 may be provided on the second surface 52B of the holding frame 52. When inserting the air filter 5 into the filter storage portion 27, the surface of the holding frame 52 where the projecting portions are provided may not be arranged so as to oppose the opposed surface 27A, and the surface on which the projecting portions are provided may be arranged so as to oppose the opposed surface 27B.

In the above-described embodiment, the projecting portions 52A1 are formed into a tapered shape. However, the invention is not limited thereto. In other words, the projecting portions 52A1 may have any shape as long as the projecting portions 52A1 project along the Z-direction from the edge portions 521 to 524. In the above-described embodiment, the entire portion of the holding frame 52 is formed of the resilient material. However, the invention is not limited thereto. In other words, a configuration in which part of the holding frame 52, which comes into tight contact with the opposed surface 27A or the opposed surface 27B of the filter storage portion 27, is formed of the resilient material is also applicable.

In the embodiment, the air filter 5 has a configuration to be inserted into the filter storage portion 27 formed in the external housing 2 via the opening 25A. However, the invention is not limited thereto. In other words, a configuration in which the air filter 5 is interposed between the external housing 2 and a lid member configured to be mounted on the external housing 2 is also applicable. In this case, an end edge of the air-inlet port of the external housing 2 and a portion of the lid member opposing the end edge correspond to a pair of opposed surfaces, and either one of the first surface 52A or the second surface 52B of the holding frame 52 may be brought into tight contact with either one of the pair of opposing surfaces.

In the embodiment, the projecting portions 52A1 are configured to be deformed inward of the frame of the holding frame 52. However, the invention is not limited thereto. In other words, the direction of deformation of the projecting portions 52A1 is not limited as long as the holding frame 52 is pressed against either one of the opposed surfaces 27A and 27B by a resilient stress generated by the deformation of the projecting portions 52A1. When the projecting portions 52A1 are deformed inward of the frame, the surfaces of the projecting portions 52A1 at the distal end portion in the projecting direction may be inclined so as to be increased in height as it goes inward of the frame, or the projecting portions 52A1 may be tilted inward of the frame in advance, whereby the projecting portions 52A1 may be tilted reliably inward of the frame as illustrated in FIG. 3.

Here, when the projecting portions 52A1 are tilted outward of the frame, which is a direction opposite to the direction inward of the frame, a force pressing the projecting portions 52A1 outward of the frame may act to cause portions near centers of the edge portions 521 and 522 which constitute the holding frame 52 in the X-direction to be deflected. However, in this embodiment, the projecting portions 52A1 are tilted inward of the frame, and hence the deflection of the holding frame 52 may be suppressed.

Figure 6:
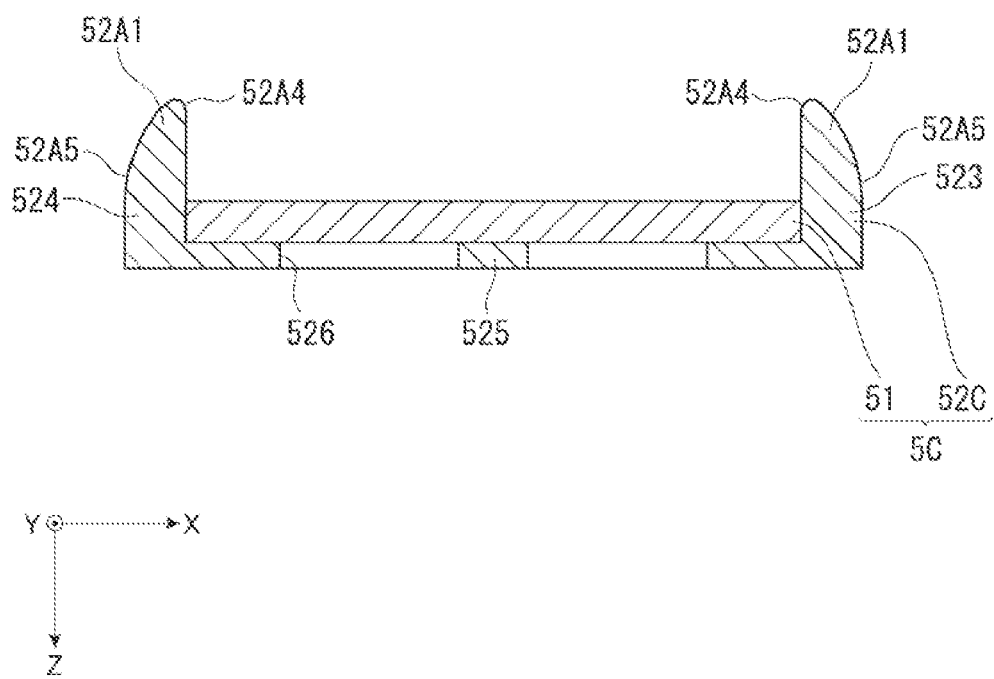
FIG. 6 is a cross-sectional view of an air filter according to a modification of the embodiment.

FIG. 6 is a drawing illustrating an air filter 5C as a modification of the air filter 5. FIG. 6 is a cross-sectional view of the air filter 5C in a state of being taken out from the filter storage portion 27 viewed in the direction of insertion of the air filter 5C into the filter storage portion 27.

The air filter 5C has the projecting portions 52A1 of a holding frame 52C having a shape different from the shape of the projecting portions 52A1 of the air filter 5. Other configurations are the same as the air filter 5.

In other words, the projecting portions 52A1 of the holding frame 52C are formed into a tapered shape in which an end portion 52A4 of the projecting portions 52A1 on the distal end side in the direction inward of the frame projects more in a direction opposite to the direction in which the filter body 51 is mounted on the holding frame 52C (the direction opposite to the Z-direction) than an end portion 52A5 on the proximal end side in the direction inward of the frame as illustrated in FIG. 6.

In other words, the projecting portions 52A1 are formed to be reduced in a dimension in the direction intersecting the direction of insertion orthogonally and the direction (X-direction) intersecting the opposite direction as it goes toward the opposite direction. Furthermore, the projecting portions 52A1 are formed so that an outer edge of the proximal end side in the direction inward of the frame is positioned in the proximity of an outer edge of the distal end side in the direction inward of the frame as it goes toward the opposite direction. The projecting portions 52A1 may be formed so that the outer edge of the distal end side in the direction inward of the frame is positioned in the proximity of the outer edge of the proximal end side in the direction inward of the frame as it goes toward the opposite direction.

In addition, the projecting portions 52A1 of the holding frame 52C may be formed into a tapered shape in which the end portion on the proximal end side in the direction of insertion projects in the opposite direction with respect to the end potion of the distal end side in the direction of insertion in the same manner as the projecting portions 52A1 of the air filter 5.

Figure 7:
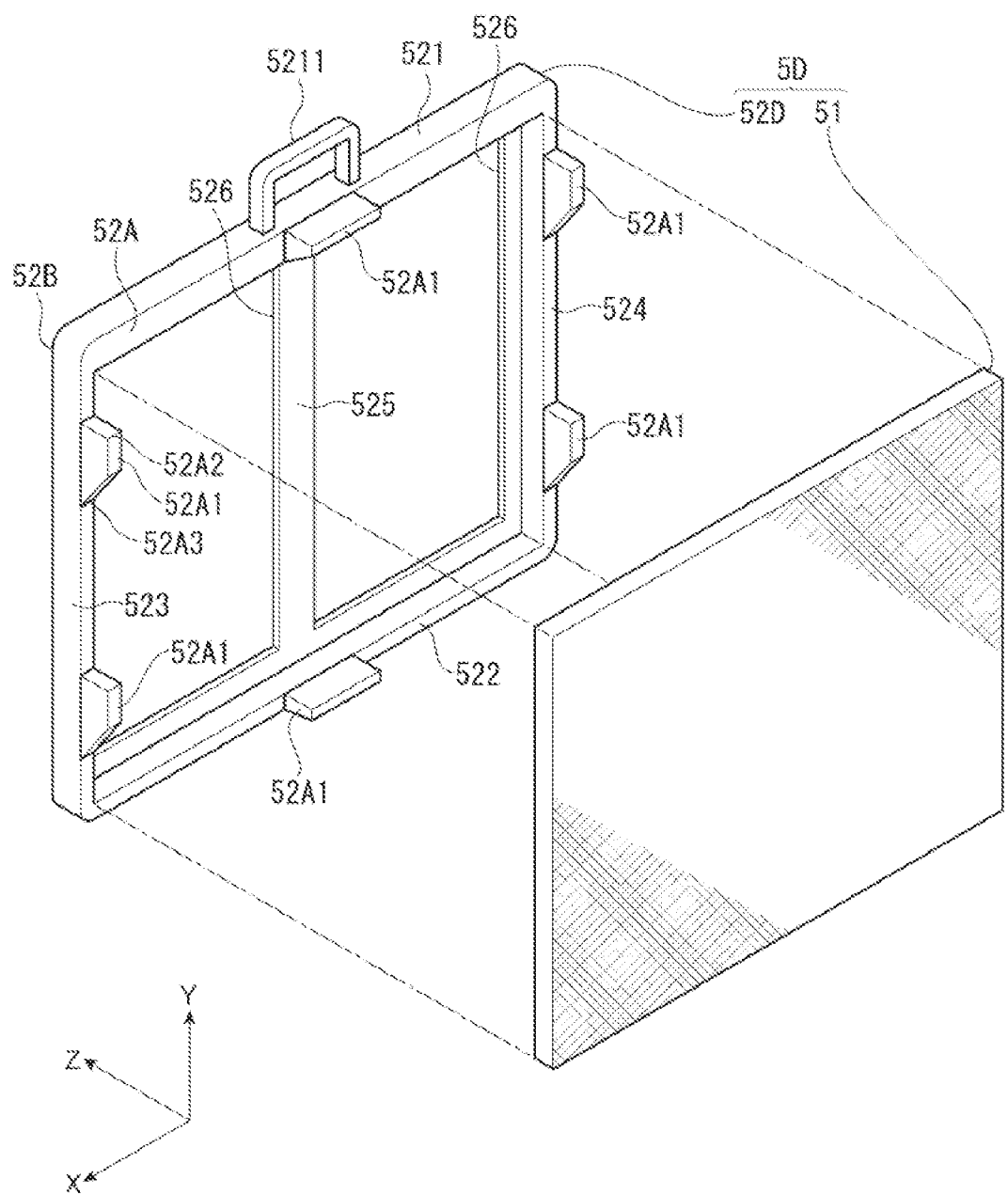
FIG. 7 is a perspective view of an air filter according to a modification of the embodiment.

FIG. 7 is a drawing illustrating an air filter 5D as a modification of the air filter 5. FIG. 7 is a perspective view illustrating the air filter 5D viewed in a direction in which the filter body 51 is mounted on the holding frame 52D. The air filter 5D has the projecting portions 52A1 of the holding frame 52D formed of a material different from the edge portions 521 to 524. Other configurations are the same as the air filter 5. The air filter 5D may be configured in such a manner that the projecting portions 52A1 are adhered to the edge portions 521 to 524 with an adhesive agent, or that the projecting portions 52A1 and the edge portions 521 to 524 are formed integrally by two-color mold (double mold).

Accordingly, for example, the projecting portions 52A1 may be formed of a material deflected more easily than the edge portions 521 to 524.

In this embodiment, an example in which the air filter 5 is applied to the projector 1 has been given. However, the invention is not limited thereto. In other words, the invention may be applied to any electronic apparatus to which an air filter configured to remove dust contained in the air in the case where the outside air is introduced into the interior via an air-inlet port formed in an external housing is applied.

The invention may be applied to a projector and, for example, may be preferably applied to a projector having an air filter.

The entire disclosure of Japanese Patent Application No. 2013-065803, filed Mar. 27, 2013 and No. 2014-007532, filed Jan. 20, 2014 are expressly incorporated by reference herein.

What is claimed is:

1. A projector configured to project an image, comprising:
an external housing constituting an exterior, the external housing including:
an introducing port configured to introduce outside air;
an air filter provided at a position corresponding to the introducing port, the air filter comprising a filter body configured to trap dust contained in air passing therethrough, and a holding frame formed of a resilient material and configured to surround an end edge of the filter body; and
a filter opening where the air filter is inserted into the external housing,
wherein
the holding frame includes a first surface on a proximal end side in a direction of travel of the air passing through the filter body and a second surface on a distal end side in the direction of travel,
one of the first surface and the second surface is provided with a projecting portion,
the projecting portion extends in a direction parallel to the direction of travel of the air passing through the filter body and perpendicular to an insertion direction in which the holding frame is inserted into the filter opening, when the air filter is mounted in the position corresponding to the introducing port after being inserted into the external housing through the filter opening, the projecting portion is deformed against a first side surface formed in the external housing and facing away from the introducing port or against a second side surface formed in the external housing and facing toward the introducing port, and a side surface of the projecting portion abuts against the first side surface or against the second side surface.

2. The projector according to claim 1, wherein the holding frame includes a pair of edge portions opposing each other in a direction orthogonal to the direction of travel of the air, and one of the first surface of each of the pair of edge portions and the second surface of each of the pair of edge portions is provided with the projecting portion.

3. The projector according to claim 2, wherein the projecting portion has a tapered shape in which one end side of both ends in a longitudinal direction of the edge portion provided with the projecting portion projects from the edge portion in comparison with the other end side when viewed in a direction of circulation of the air passing through the filter body.

4. The projector according to claim 1, wherein the resilient material is an elastomer.

5. The projector according to claim 1, wherein the external housing further includes a pair of opposed surfaces extending in the insertion direction and opposing the holding frame, and at least a portion of each of the opposed surfaces is curved such that the holding frame deforms in accordance with a curvature of the opposed surfaces when inserted between the opposed surfaces, and the curvature of the opposed surfaces increases as the opposed surfaces extend in the insertion direction away from the filter opening.

6. The projector according to claim 1, wherein the side surface of the projecting portion extends in a direction that is substantially orthogonal to the first side surface and the second side surface, and when the air filter is mounted inside the exterior housing in the position corresponding to the introducing port, the side surface of the projecting portion is deformed to extend in a direction parallel to the first surface and the second side surface, the side surface abutting against the first side surface or against the second side surface.

7. The projector according to claim 1, wherein when the air filter is mounted inside the exterior housing in the position corresponding to the introducing port, the side surface of the projecting portion is deformed to extend in a direction substantially orthogonal to the direction of travel of the air passing through the filter body.

* * * * *